US012147947B2

(12) United States Patent
Khan et al.

(10) Patent No.: US 12,147,947 B2
(45) Date of Patent: Nov. 19, 2024

(54) STANDARDIZING GLOBAL ENTITY JOB DESCRIPTIONS

(71) Applicant: International Business Machines Corporation, Armonk, NY (US)

(72) Inventors: Tanveer Akhter Khan, Indore (IN); Madhusmita Guru, Hyderabad (IN); Parag Sanjay Mhatre, Pen (IN); Karanam Rakesh, Bangalore (IN); Renjith Koorumullamkattil Mathew, Bengaluru (IN); Prasanna Chandrasekharan Nair, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 17/511,466

(22) Filed: Oct. 26, 2021

(65) Prior Publication Data
US 2023/0131236 A1   Apr. 27, 2023

(51) Int. Cl.
*G06Q 10/1053*   (2023.01)

(52) U.S. Cl.
CPC .............................. *G06Q 10/1053* (2013.01)

(58) Field of Classification Search
CPC ...... G06Q 10/1053; G06N 20/00; G06N 5/02; G06F 40/30; G06F 40/20; G06F 40/211; G06F 40/205; G06F 40/221; G06F 40/284

See application file for complete search history.

(56) References Cited

U.S. PATENT DOCUMENTS 8,112,296 B2   2/2012   Muralitharan
11,373,146 B1 *   6/2022   Yerastov ................ G06N 5/022
(Continued)

FOREIGN PATENT DOCUMENTS

WO   2011119864 A1   9/2011

OTHER PUBLICATIONS

Briggs, "BERT for Measuring Text Similarity" (May 5, 2021) (Year: 2021).*

(Continued)

*Primary Examiner* — Kiersten V Summers
*Assistant Examiner* — Ivonnemary Rivera Gonzalez
(74) *Attorney, Agent, or Firm* — Joseph P. Curcuru (57) ABSTRACT

In an approach to provide consistent job descriptions for global entities, computer-implemented methods, computer program products, and computer systems for standardizing global entity job descriptions are described. The computer-implemented method for standardizing global entity job descriptions may include one or more processors configured for receiving first job identifier data corresponding to a job posting having a plurality of job descriptions, generating second job identifier data by removing duplicate job descriptions and outlier job descriptions from the plurality of job descriptions, determining job description intents for the plurality of job descriptions based at least on the second job identifier data, generating third job identifier data corresponding to job description similarity groupings based on the job description intents and the second job identifier data, and generating fourth job identifier data comprising a standard job description based on the third job identifier data.

20 Claims, 5 Drawing Sheets

(56) References Cited

U.S. PATENT DOCUMENTS

| | | | |
|---|---|---|---|
| 2008/0065630 A1 | 3/2008 | Luo | |
| 2009/0276231 A1 | 11/2009 | Bazigos | |
| 2009/0276295 A1 | 11/2009 | Dane | |
| 2009/0276415 A1* | 11/2009 | Dane | G06F 16/313 707/999.005 |
| 2016/0092838 A1* | 3/2016 | Hardtke | G06Q 50/01 705/319 |
| 2016/0092839 A1* | 3/2016 | Vembunarayan | G06F 16/2365 705/321 |
| 2016/0117385 A1 | 4/2016 | Goel | |
| 2016/0203139 A1* | 7/2016 | Monsch | G06F 16/24578 707/749 |
| 2017/0270485 A1 | 9/2017 | Meier | |
| 2018/0143975 A1* | 5/2018 | Casal | G06F 40/51 |
| 2018/0150534 A1* | 5/2018 | Malherbe | G06Q 10/1053 |
| 2018/0181609 A1* | 6/2018 | Chen | G06F 16/2255 |
| 2019/0197482 A1* | 6/2019 | George | G06F 40/30 |
| 2019/0385123 A1* | 12/2019 | Sawarkar | G06N 3/08 |
| 2020/0065770 A1* | 2/2020 | Janapareddy | G06F 40/174 |
| 2021/0303638 A1* | 9/2021 | Zhong | G06F 40/284 |
| 2021/0334674 A1* | 10/2021 | Kuang | G06Q 10/105 |
| 2021/0357378 A1* | 11/2021 | Urdiales | G06F 16/2237 |
| 2022/0180323 A1* | 6/2022 | Di Sipio | G06F 18/21355 |

OTHER PUBLICATIONS

Jolliffe, "Principal component analysis: a review and recent developments" (Apr. 16, 2016) (Year: 2016).*
Németh, "BERT Visualization in Embedding Projector" (Dec. 4, 2019) (Year: 2019).*
Devlin, "BERT: Pre-training of Deep Bidirectional Transformers for Language Understanding" (May 24, 2019) (Year: 2019).*
Horev, "BERT Explained: State of the art language model for NLP" (Nov. 10, 2018) (Year: 2018).*
Khalid, "BERT Explained: A Complete Guide with Theory and Tutorial" (Nov. 3, 2019) (Year: 2019).*
Ganesh, "Compressing Large-Scale Transformer-Based Models: A Case Study on BERT" (Jun. 2, 2021) (Year: 2021).*
Van der Maaten, "Visualizing Data using t-SNE" (Nov. 2008) (Year: 2008).*
Reimers, "Sentence-BERT: Sentence Embeddings using Siamese BERT-Networks" (Aug. 2019) (Year: 2019).*
Ma, "News2vec: News Network Embedding with Subnode Information" (Nov. 3-7, 2019) (Year: 2019).*
Choudhary, "A Comparative Study of Methods for Visualizable Semantic Embedding of Small Text Corpora" (Jul. 18-22, 2021) (Year: 2021).*
Cao, "Occupational profiling driven by online job advertisements: Taking the data analysis and processing engineering technicians as an example" (Jun. 22, 2021) (Year: 2021).*
Agarap, "Deep Learning using Rectified Linear Units (ReLU)" (Feb. 7, 2019) (Year: 2019).*
Brownlee, "A Gentle Introduction to the Rectified Linear Unit (ReLU)" (Aug. 20, 2020) (Year: 2020).*
Authors et al.: Disclosed Anonymously, "An automated System and Method to prevent, detect and mitigate bias during employee recruitment", An IP.com Prior Art Database Technical Disclosure, IP.com No. IPCOM000259904D, IP.com Electronic Publication Date: Sep. 29, 2019, 5 Pages.
Bernabé-Moreno et al., "An automatic skills standardization method based on subject expert knowledge extraction and semantic matching", Procedia Computer Science, vol. 162, Jan. 2019, 9 Pages.

* cited by examiner

STANDARDIZING GLOBAL ENTITY JOB DESCRIPTIONS

BACKGROUND

The present invention relates generally to the field of data processing, and more particularly to standardizing global entity job descriptions using artificial intelligence (AI).

A job description is a compilation of text or narrative that describes general tasks, related duties, and responsibilities of an employee or independent contractor position. A job description may also include a supervisor title or title to whom the potential employee will report to. Further, job descriptions may include requirements to be considered for the job, such as qualifications, and skills, and describe tools needed to perform the job, working conditions and a salary range.

From an employment industry perspective, the job description is the first impression an employer makes with a potential employee or recruiter. Well written and well-constructed job descriptions pique potential employees' interest, especially if that potential employee is not necessarily looking for a new job. Global entities (i.e., multi-national corporations) publish various job profiles or job positions for the same position across all their market territories. Many of these global entities use various media channels (e.g., websites, job portals, print media, social media) to publish the job descriptions. Recruiters, hired by global entities to fill the subject positions, are usually tasked with preparing the job descriptions with input from a hiring manager.

SUMMARY

Embodiments of the present invention describe computer-implemented methods, computer program products, and computer systems for standardizing global entity job descriptions.

In an embodiment, the computer-implemented method may include one or more processors configured for receiving first job identifier data corresponding to a job posting having a plurality of job descriptions; generating second job identifier data by removing duplicate job descriptions and outlier job descriptions from the plurality of job descriptions; determining job description intents for the plurality of job descriptions based at least on the second job identifier data; generating third job identifier data corresponding to job description similarity groupings based on the job description intents and the second job identifier data; and generating fourth job identifier data comprising a standard job description based on the third job identifier data.

DETAILED DESCRIPTION

Embodiments of the present invention recognize that, as a multi-national corporate employer, making a first impression regarding a job opening is key to attracting talented, hard-working, and well-qualified candidates for any position within the company. That first impression usually occurs with a job posting describing the job opening. However, the same job posting may be published across various mediums, resulting in different formats, styles, language, descriptions, which results in inconsistencies regarding what the actual role is. Inconsistencies lead to confusion, which leads to poor first impressions. For example, even though different hiring managers within the same geographical region may be recruiting applicants for the same job posting, such hiring managers may author very different job descriptions based upon various preferences and writing styles of the author. Therefore, although each hiring manager may be recruiting applicants for the same position, publishing inconsistent job descriptions create confusion among candidate pools. This problem becomes more apparent when global entities are hiring for the same position in different geographical regions.

Embodiments of the present invention also recognize that having multiple inconsistent job descriptions for a single job posting creates various problems. For example, job description inconsistencies tarnish the employer's brand image because it gives the impression that the employer is not certain about the job requirements and qualifications. Further, important details may be left out of some of the job description postings, which may make the difference between a highly qualified candidate applying or not. Further, inconsistent job descriptions fail to leverage the employer's global perspective, creates confusion among the candidate pool, are difficult to manage among those responsible for recruiting for the position, and can lead to unfair bias among candidates for the position.

Embodiments of the present invention describe computer-implemented methods, systems, and computer program products for standardizing global entity job descriptions. As described herein, one or more processors may be configured to receive and analyze job description data corresponding to multiple job descriptions for a single job posting. For example, the one or more processors may be configured to process job description data in various formats and standardize the various formats into a uniform format to perform further processing on the job description data.

Embodiments of the present invention implement artificial intelligence (AI) and machine learning (ML) techniques to process data to create a standard and global job description. For example, one or more processors may be configured to receive job identifier data, process the job identifier data using a machine learning model, and generate model output data corresponding to cleaned, consistent and relative best job description section sentences to generate a standardized job description. Further, the one or more processors may be configured to perform intent identification by classifying sentences based on intent, perform de-duplication, and validate and correct the identified intents. Further, the one or more processors may be configured to perform post processing on AI generated job descriptions.

Focusing on natural language understanding (NLU), the goal of NLU is to comprehend a natural language sentence ranging from the syntactic composition and the roles of words in the sentence to its semantic meaning, context, and other tasks. Embodiments described herein focus on the task of identifying specific grammatical sentence structures in a dialog setting, notable job description categories, and job description posting sections. Identifying the type of sentence is useful for classifying job description sections and determining the intent of the job description sections in multiple scenarios. For example, identifying job description sections and corresponding intents facilitates determining similarities and differences between job description sections from pluralities of job description postings. Such similarity and difference determinations enable the embodiments described herein to group most similar job description section sentences with each other and to select the job description section sentence that is the best out of the group of sentences. For example, the best job description section sentence may correspond to the sentence having a max similarity score with respect to the other grouped job description section sentences.

Embodiments described herein provide computer-implemented methods configured to train a machine learning model to performing intent recognition that does not take the domain of the request into account. Further, machine learning models (e.g., shallow, deep learning) may be trained on various features including sentence embeddings and syntactic features. As a result, a specific natural language task and identification of its importance in messaging dialog systems are defined and contributed to the embodiments described herein. Further, embodiments described herein include labeled collections of sentences and a machine learning model that has learned the classification task.

Embodiments described herein provide a machine learning model that captures a sentence's syntactic structure and overall meaning, identifying the sentence's property describing the type of job description section, intent of the job description sentence, or otherwise.

Embodiments described herein may also include encoding sentences into sentence embeddings using Siamese Bidirectional Encoder Representations from Transformers (BERT)-Networks with a pretrained BERT model (bert-base-nli-mean-tokens). For example, two different sets (e.g., base and compressed) of embeddings may be used to generate classifications. From the base pretrained model, a principal component analysis (PCA) method may be used to compress the default 768 dimension vector from BERT into dimensions of 100, 200, and 400.

In addition to creating the sentence embeddings, embodiments described herein are configured to capture the syntactic structure of the sentences using text tags (e.g., parts-of-speech (POS) tags, verb tags, similarity tags) because a model may be able to learn the pattern behind text tags that indicate a verb, or similarities among other sentences. For example, a natural language toolkit (NLTK)'s POS tagger may be used to create count and location features by comparing the frequency of occurrences as well as the location of the first appearance of a tag in the sentence. To calculate location, the distance of each word measured by its index from the center of the sentence may be divided by the length of the sentence. Location values closer to −1 are near the beginning of the sentence and values closer to 1 are near the end. Location values may be shifted by +1 to eliminate negative values as inputs to some feature selection algorithms that require non-negative inputs.

Embodiments described herein may include multiple feature selection algorithms to perform automatic feature selection. For example, Pearson correlation filtering, Chi-squared filtering, or Kullback-Leibler divergence may be used to perform automatic feature selection.

Embodiments described herein may include one or more models to choose from for a specific application based on certain application parameters. For example, application parameters may include complexity/simplicity of the problem, computational constraints (e.g., space and time) on training/testing, and problem characteristics (e.g., feature independence/dependence, amount of data noise, stochasticity, stationarity), among others. Each model may have a set of hyper-parameters that may be tuned to optimize training (e.g., feature mapping function, number of hidden neurons).

Embodiments described herein may include various types of machine learning models and techniques for training the machine learning models are used in improving intent determination in the standardizing global entity job descriptions system. For example, supervised learning techniques may be used on shallow models (e.g., SVM, k-nearest neighbor (kNN), random forest, decision tree, naïve Bayes) to serve as a baseline for comparison with deep learning models. Further, embodiments described herein may include performing grid search to fine-tune the hyper-parameters for SVM models, kNN models, or multi-later perceptron (MLP) models.

Embodiments described herein may include deep learning models to emulate the bidirectional-Long Short-Term Memory (LSTM) model to provide state of the art results for Natural Language Processing (NLP) tasks. For example, in a conversational environment, both the front and back halves of a sentence may be analyzed to provide the context to help in determining the meaning or intent of a sentence. Thus, a bidirectional-LSTM may provide improved results in analyzing the sentence in both front and back portions as opposed to a uni-directional LSTM.

Embodiments described herein may include training the machine learning models using a combination of pretrained BERT sentence embeddings and text tags as input features to the machine learning models. For example, the input sentence embeddings may include dimensions of 768, 400, 200, or 100, scaling by a factor of approximately 2. Further, the sentence embeddings may be visualized in a 2-dimensional space by applying t-Distributed Stochastic Neighbor Embedding (t-SNE) with a perplexity of 50 on the 768-dimension sentence vectors. Further, 10-fold cross validation may be performed on the sentence vectors to report the train/validation performance.

Embodiments described herein may also include capturing more natural language structure from the sentences by appending text tags (e.g., count, location, gerunds) of the sentences to the feature set. By including the text tags, the models realize an improved performance because the text tags assist the model in learning the natural language sentence structures and intents. Furthermore, aggregating all shadow model results and feature sets, the SVM-based classifier model results in the least bias and generalizes well on unseen data when trained on text tag features and BERT sentence embeddings.

Embodiments described herein may include, for example, a bidirectional LSTM model on sentence embeddings of dimension 768, 400, 200 or 100. Sentence embedding dimensions may vary based on a format or features of the input data. Sentence embeddings and text tags may be included as the feature sets to the bidirectional LSTM model to generate satisfactory results indicating that the bidirectional LSTM model performs best with the addition of syntactic language features to the sentence embeddings.

Embodiments of the present invention recognize that a custom solution is desired for improving intent determination in a global entity job description standardization system in an efficient and convenient manner. Implementations of embodiments of the invention may take a variety of forms, and exemplary implementation details are discussed subsequently with reference to the Figures.

Figure 1:
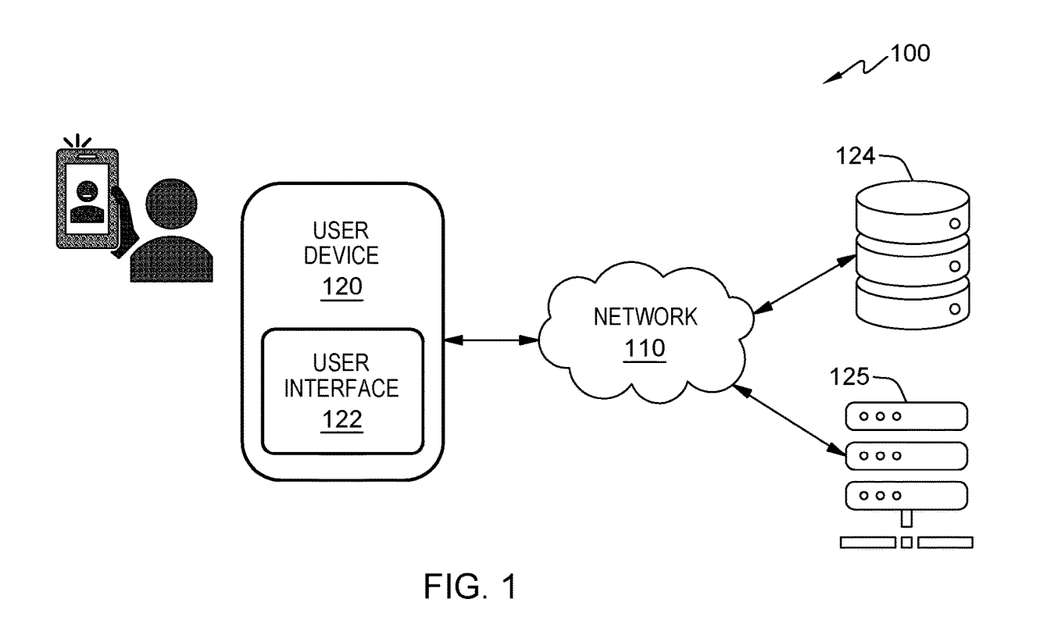
FIG. 1 depicts a block diagram of a distributed data processing environment for standardizing global entity job descriptions, in accordance with an embodiment of the present invention.

FIG. 1 depicts a block diagram of a distributed data processing environment 100 for standardizing global entity job descriptions, in accordance with an embodiment of the present invention. FIG. 1 provides only an illustration of one embodiment of the present invention and does not imply any limitations with regard to the environments in which different embodiments may be implemented. In the depicted embodiment, distributed data processing environment 100 includes user device 120, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between user device 120, server 125, and database 124. Distributed data processing environment 100 may also include additional servers, computers, or other devices not shown.

The term "distributed" as used herein describes a computer system that includes multiple, physically distinct devices that operate together as a single computer system. Many modifications to the depicted environment may be made by those skilled in the art without departing from the scope of the invention as recited by the claims.

User device 120 may operate to execute at least a part of a computer program for standardizing global entity job descriptions. In an embodiment, user device 120 may be configured to send and/or receive data from one or more of database 124 and server 125 via network 110. User device 120 may include user interface 122 configured to facilitate interaction between a user and user device 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with user device 120.

In some embodiments, user device 120 may be a management server, a web server, or any other electronic device or computing system capable of receiving and sending data. In some embodiments, user device 120 may be a laptop computer, tablet computer, netbook computer, personal computer (PC), a desktop computer, a smart phone, or any programmable electronic device capable of communicating with database 124, server 125 via network 110. User device 120 may include components as described in further detail in FIG. 5.

Database 124 operates as a repository for data flowing to and from network 110. Examples of data include data corresponding to communications entered and received via user interface 122. A database is an organized collection of data. Database 124 can be implemented with any type of storage device capable of storing data and configuration files that can be accessed and utilized by user device 120, such as a database server, a hard disk drive, or a flash memory. In an embodiment, database 124 is accessed by user device 120 to store data corresponding to messaging communications with via user interface 122. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with user device 120 and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 5.

Figure 2:
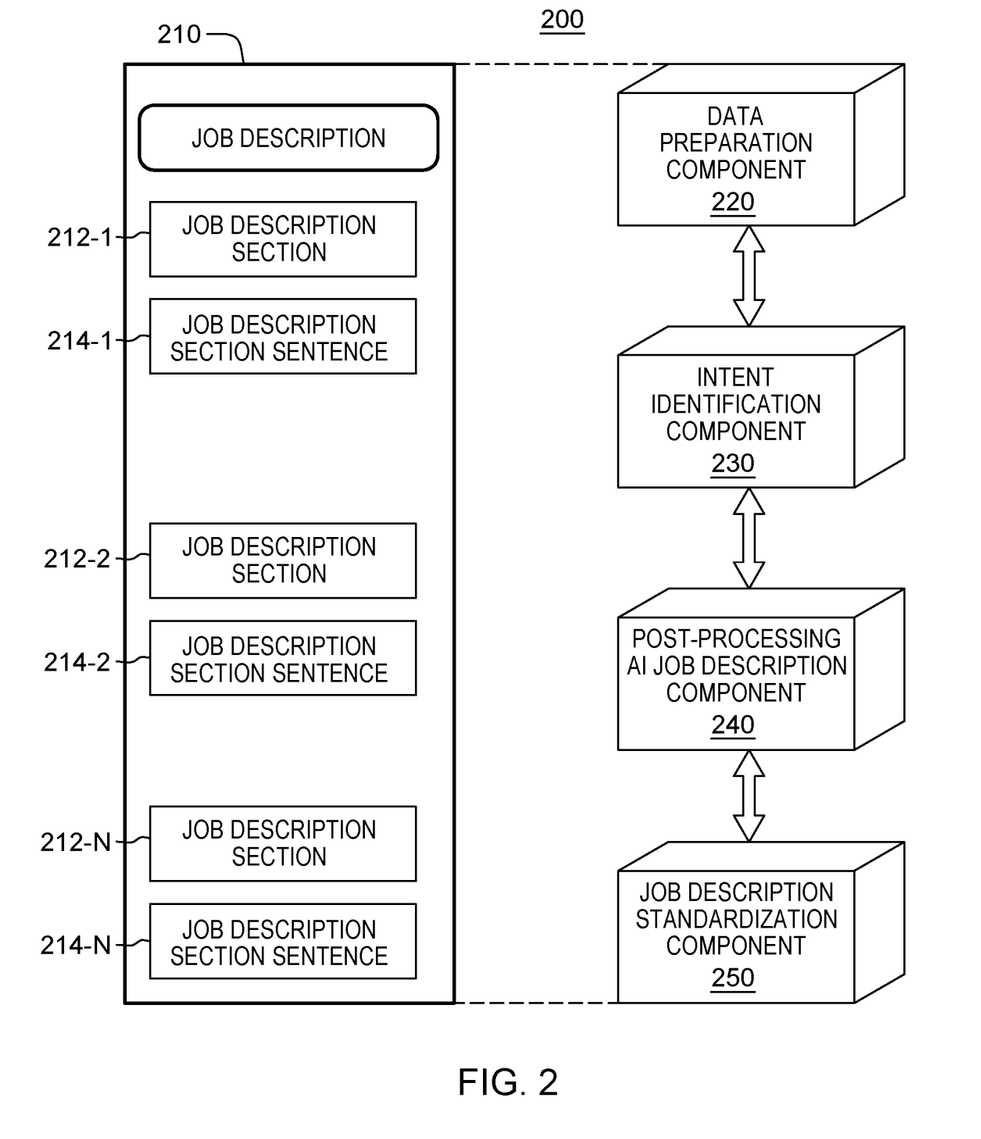
FIG. 2 depicts block diagram of a system for standardizing global entity job descriptions, in accordance with an embodiment of the present invention.

FIG. 2 depicts a block diagram of a system 200 for standardizing global entity job descriptions, in accordance with an embodiment of the present invention.

In an embodiment, system 200 may include one or more processors configured to generate user interface 122 on a display of a computing device, such as user device 120 of FIG. 1. Further, system 200 may include one or more processors configured to generate a job description template 210 via user interface 122, wherein job description template 210 may be configured to facilitate user customization and design of a standardized global entity job description. Further, system 200 may include data preparation component 220, intent identification component 230, post-processing AI job description component 240, and job description standardization component 250, each in communication with other components within system 200.

System 200 may be configured to use a Natural Language Processing (NLP) engine (not shown) to process and interpret job identifier data received in the job description template 210 displayed and executing within user interface 122. For example, job identifier data received in the job description template 210 may include one or more of job description sections 212-1, 212-2, 212-N and one or more of job description section sentences 214-1, 214-2, 214-N. For example, job description sections 212-1, 212-2, 212-N may include a Title, Brief, Summary, Duties, Responsibilities, Qualifications, About Company, Reporting Structure, Objective, Work Environment, Benefits, Salary, Language, or any other sections applicable to a job description. Furthermore, job description section sentences 214-1, 214-2, 214-N may include any sentence describing the corresponding job description section.

In an embodiment, an NLP engine is a core component that interprets sentences at any given time and converts the sentences to structured inputs that the system can process. NLP engines may contain advanced machine learning algorithms to identify intent in job description sections, corresponding job description section sentences, and further matches job description sections and corresponding sentences to a list of available intents available to the system. For example, NLP engines may use either finite state automatic models or deep learning models to generate intent determinations. NLP engine may include an intent classifier and an entity extractor, wherein the intent classifier may be configured to interpret the natural language of a sentence and the entity extractor may be configured to extract key information or keywords from the sentence.

In an embodiment, system 200 may include one or more processors configured for reading and analyzing job description text data or job identifier data corresponding to a natural language (NL) text in one or more of job description sections 212-1, 212-2, 212-N and one or more of job description section sentences 214-1, 214-2, 214-N. Further, the one or more processors may be configured for processing various types of document formats or data formats in which the job description text data exists. For example, an NLP engine may be configured to process one or more of job description sections 212-1, 212-2, 212-N and one or more of job description section sentences 214-1, 214-2, 214-N to identify NL text in the one or more of job description sections 212-1, 212-2, 212-N and one or more of job description section sentences 214-1, 214-2, 214-N and to process the job description text data to identify NL text in the job description text data.

In an embodiment, system 200 may include data preparation component 220 configured for receiving one or more of job description sections 212 and preparing the data included in the one or more job description sections 212. For example, data preparation component 220 may include one or more machine learning models configured to perform feature extraction on NL text corresponding to job identifier data, process the extracted features to identify duplicate job descriptions, and mark the duplicate job descriptions as such to generate subsequent job identifier data. Further data preparation component 220 may include one or more machine learning models configured to perform feature extraction on NL text corresponding to job identifier data, process the extracted features to identify a language mismatch (e.g., one or more out of a plurality of job descriptions is in a language that does not match the language of most of the other job descriptions), and mark the nonmatching language as such to generate subsequent job identifier data. Further, data preparation component 220 may be configured to determine a classification of whether the NL text job identifier data is a duplicate, in a nonmatching language, and mark it with such a designation to generate subsequent job identifier data.

In an embodiment, system 200 may include intent identification component 230 configured to receive job identifier data from data preparation component 220, wherein the job identifier data coming from data preparation component 220 corresponds to the marked job descriptions. Further, intent identification component 230 may be configured to determine job description intents for the one or more job description section sentences 214-1, 214-2, 214-N. For example, the one or more processors may be configured to apply sentence tokenization, apply sentence cleaning, predict intent using a deep learning (DL) model, and to apply business logic for "Nice to have" or "Preferred Intent" sentences to generate subsequent job identifier data corresponding to job description intents.

In an embodiment, intent identification component 230 may include a LSTM deep learning model comprising a LSTM Layer configured to implement glove word vectors to convert sentence sequences to word embeddings as part of an embedding layer. Further, the LSTM deep learning model may be trained by providing sentence as model input data and job description section names as label information. The LSTM deep learning model may include an LSTM layer followed by dense layers with ReLu activation followed by the output layer with softmax. The hyperparameters in the model architecture may be tuned using grid search for the best parameters. Once the LSTM deep learning model is trained, the LSTM deep learning model would be configured to generate model output data corresponding to predictions on the unseen model input data.

In an embodiment, intent identification component 230 may be configured to receive model input data from data preparation component 220, wherein model input data may be configured to generate input sentence classifications for each job description and the corresponding job description sections (e.g., Job Summary, Responsibilities, Qualifications etc.). Further, results corresponding to model output data from intent identification component 230 may be grouped to their corresponding sections and business rules would be applied to further refine the results. For example, a business rule may include instructions to divide qualifications as "Must Have Qualifications" and "Nice to Have Qualifications".

In an embodiment, system 200 may include post-processing artificial intelligence (PPAI) job description component 240 configured to receive job identifier data from intent identification component 230, wherein the job identifier data coming from intent identification component 230 corresponds to the job description intents. Further, PPAI job description component 240 may be configured to generate job identifier data corresponding to job description similarity groupings based on the job description intents and the received job identifier data. For example, intent identification component 240 may be configured to aggregate one or more of the job description sections 212, job description section sentences 214, and the job description intents to determine job description similarity groupings. Further, intent identification component 240 may be configured to deduplicate one or more of the job description sections 212, job description section sentences 214, and the job description intents to determine job description similarity groupings.

In an embodiment, PPAI job description component 240 may be configured to aggregate and deduplicate one or more of the job description sections 212 and job description section sentences 214 by performing a verb check (i.e., identifying words ending with "ing", identifying words that shows action or a state of being) to identify a Responsibility (ies) section. For example, if a word in a job description sentence includes a verb, then the one or more processors may be configured to identify the job description section that includes that verb inclusive sentence as the Responsibilities section of the job description.

In an embodiment, PPAI job description component 240 may be configured to identify word features in the job description section sentences 214 to predict a type of job description section that includes the words with identified word features based on one or more of the job identifier data and the job description intents. For example, word features corresponding to a job title, job summary, or any other job description section may be used to train a machine learning (ML) model to classify words in job description sentences to assist in predicting the type of job description sentence.

In an embodiment, PPAI job description component 240 may be configured to calculate a similarity matrix of the job description sentences 214. For example, PPAI job description component may be configured to compute Bidirectional Encoder Representation from Transformers (BERT) based similarity matrix for job description sentences in each of the job description sections. Further, similarity matrix may be configured to remove contextually similar or duplicate sentences.

In an embodiment, PPAI job description component 240 may be configured to group job description sentences 214 if they exceed a similarity threshold (e.g., 75%). For example, if the job identifier data includes 100 job description sentences, and a first job description sentence and a second job description sentence are similar to more than 75 of the 100 job description sentences, then the first job description sentence and the second job description sentence will be grouped together as a first group of job description sentences.

In an embodiment, PPAI job description component 240 may be configured to determine a best job description sentence from a group of job description sentences based on identifying the job description sentence that has a maximum similarity score with respect to other job description sentences (e.g., grouped job description sentences, ungrouped job description sentences). The best job description sentence may be represented as job identifier data corresponding to the job description similarity groupings for each of the one or more job description sections 212 and their corresponding job description section sentences 214.

In an embodiment, system 200 may include job description standardization component 250 configured to receive and process job identifier data from PPAI job description component 250 to generate a standard job description comprising each job description section and the corresponding job description section sentence. For example, job description standardization component 250 may be configured to rank (e.g., using the PageRank algorithm) each job description sentence and/or each job description intent for each frequency value.

In an embodiment, system 200 may include job description standardization component 250 configured to map a job summary to one or more of the ranked or unranked job description sections, job description section sentences, and job description intents. The job summary may be provided by a client or obtained independent of a client. In an embodiment, the job summary may be further aligned based on organizational guidance by considering multiple factors that may include organization goals, values, expectation for a job role based on a job band level. The multiple factors can be incorporated into the job summary mapping using existing information available from the organization.

In an embodiment, system 200 may include job description standardization component 250 configured to generate each of the job description sections in a standardized template. For example, one or more of the job description sections can be further arranged and collated into a standard template based on the ranking of sentences in each job description section. Further, job description standardization component 250 may be configured to omit outdated and irrelevant information. Job description standardization component 250 may be configured to improve the appearance of the standardized job description by adjusting the format and layout of the standardized job description. For example, job description standardization component 250 may limit a page count to a specific number of pages (e.g., 2 page limit). Job description standardization component 250 may also be configured to export the final standardized description into a specific document format (e.g., .pdf, .doc, .html).

While the foregoing describes implementation of a machine learning model, the present disclosure is not limited thereto. In at least some embodiments, a machine learning model may implement a trained component or trained model configured to perform the processes described above. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In an embodiment, intent identification component 230 may further include one or processors configured for processing, by a trained machine learning model, job identifier data to generate model output data corresponding to a prediction of job description intent. For example, intent identification component 230 may be configured to process one job identifier data corresponding to one or more of job description sections 212 and job description section sentences 214 to generate sentence tokens based on a sentence delimiter. Further, intent identification component 230 may be configured to perform sentence cleaning on the sentence tokens to generate cleaned sentence tokens and predict job description intents if a classification satisfies a condition based on model output data. The classification may correspond to a first class (class 1) indicating that the job identifier data corresponds to a first job description section or a first job description section sentence or a second class (class 0) indicating that the job identifier data does not correspond to a first job description section or a first job description section sentence. A condition may include a binary classification or a score corresponding to a binary classification.

In an embodiment, the first machine learning model may include a shallow model, as described above herein, wherein the shallow model is trained on various features (e.g., sentence embeddings, syntactic features) configured to generate model output data in response to receiving and processing NL text job identifier data. The model output data may include a binary classification indicating an intent of the NL text job identifier data.

In an embodiment, the first machine learning model may include one or more of a shallow model or a deep learning model, as described above herein, wherein the shallow model and the deep learning models are trained on various features (e.g., sentence embeddings, syntactic features) configured to generate model output data in response to receiving and processing NL text data. The model output data may include a binary classification indicating whether the NL text data expects a response or does not expect a response. This determination improves the conversational experience in situations where digression or disambiguation occur.

In an embodiment, intent identification component 230 may further include one or processors configured for appending parts of speech (POS) tags to one or more words in the NL text job identifier data to generate tagged NL text job identifier data. Further, intent identification component 230 may include one or more processors configured for encoding the NL text job identifier data into sentence embeddings having a dimension of 768 or less.

In an embodiment, intent identification component 230 may include one or more processors configured for processing, by a trained machine learning model, the tagged NL text job identifier data and the sentence embeddings to generate model output data corresponding to a job description intent classification. Further, the one or more processors may be configured for determining the NL text job identifier data as an intent of the job description section if the model output data classification satisfies a condition.

In an embodiment, the job identifier may include a document entry, wherein system 200 may further include one or more processors configured for extracting document entry data from the job identifier data and processing the document entry data to determine NL text data, wherein determining job description intents is based at least on the natural language text data.

In an embodiment, the one or more processors may be configured for comparing job description sections 212, job description section sentences 214, and job description intents to determine a similarity threshold is met. For example, if a first job description section is a job summary and a second job description section is a job title, then the similarity threshold would not be met because the sections are not similar. As another example, if a first job description section is a job summary and the second job description section is a job overview, then the similarity threshold would be met because the sections are the same type of job description section. Similarly, job description section sentences may be compared to determine if a similarity threshold is met.

Figure 3:
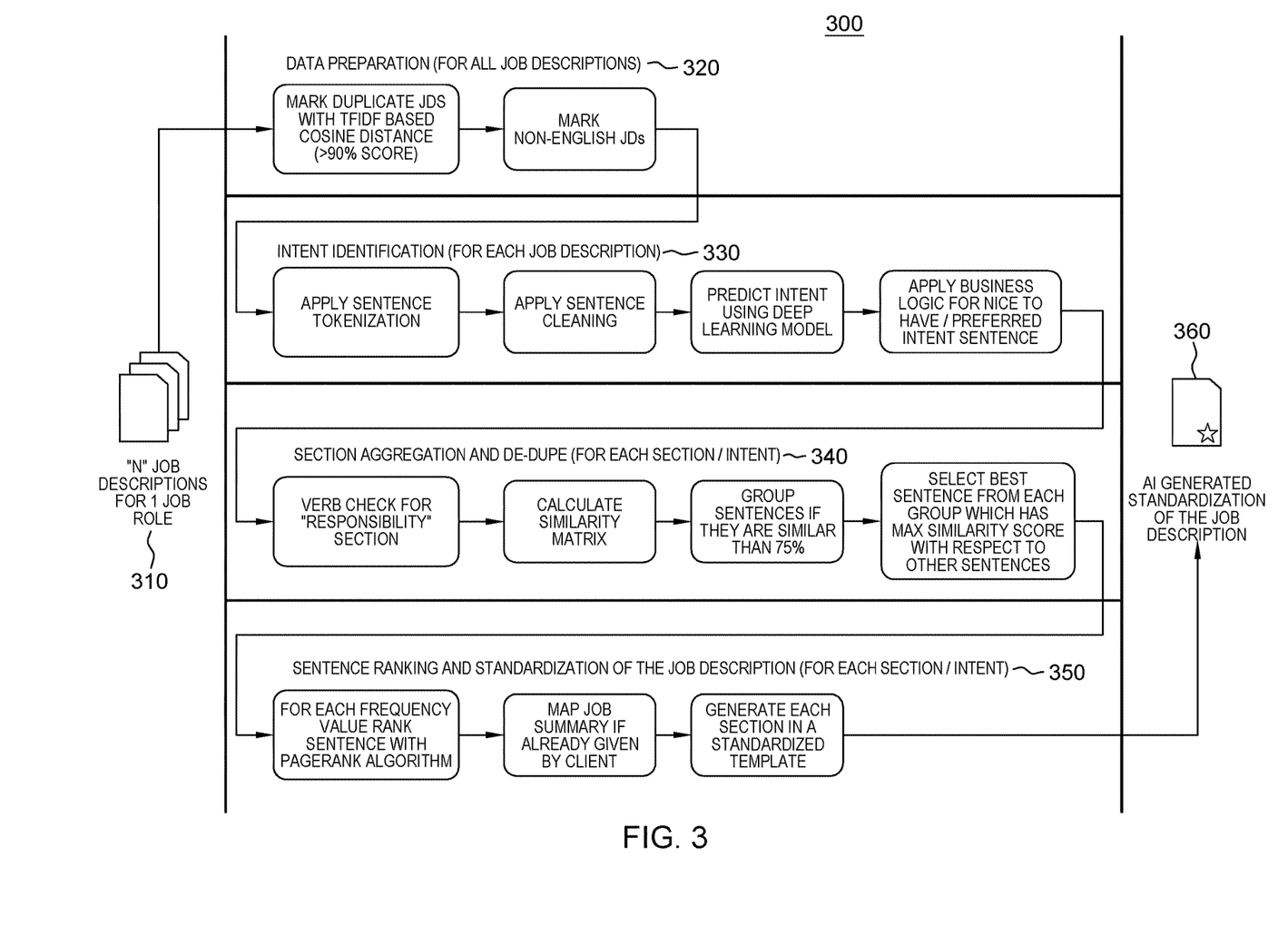
FIG. 3 depicts a process for standardizing global entity job descriptions, in accordance with an embodiment of the present invention.

FIG. 3 depicts a process 300 for standardizing global entity job descriptions, in accordance with an embodiment of the present invention.

In an embodiment, process 300 may be configured to receive "N" job descriptions (e.g., job identifier data 310) for a job role or job posting. For example, process 300 may receive a plurality of job descriptions represented in job identifier data 310 as NL text data. In other words, process 300 may include one or more processors configured for receiving job identifier data 310 (e.g., "N" job descriptions) for one (1) job role. Further, process 300 may be configured to perform data preparation 320 on all job descriptions in the job identifier data 310 to reduce data clutter or redundancies, perform intent identification 330 for each job description in the job identifier data, perform section aggregation and de-duplication 340 for each section and/or intent for each job description section and/or job description intent, and perform sentence ranking and standardization 350 for each job description section and/or job description intent.

In an embodiment, performing data preparation 320 may include one or more processors configured to mark duplicate job descriptions with term-frequency inverse-document frequency (TD IDF) based cosine distance (e.g., greater than 90% score). In an embodiment, performing data preparation 320 may also include one or more processors configured to mark non-English job descriptions.

In an embodiment, process 300 may include one or more processors configured identify 330 job description intents for each job description. For example, one or more processors may be configured to apply sentence tokenization, apply sentence cleaning, predict intent using a deep learning model, and apply business logic to "Nice to Have" or "Preferred Intent" sentences.

In an embodiment, process 300 may include one or more processors configured to aggregate and deduplicate 340 one or more of the job description sections and job description intents to identify and select a best sentence (or section) from a group of similar sentences (or sections). For example, the one or more processors may be configured to identify a Responsibility section job description section by performing a verb check (i.e., identifying words ending with "ing", identifying words that shows action or a state of being). Further, if a word in a job description sentence includes a verb, then the one or more processors may be configured to identify the job description section that includes that verb inclusive sentence as the Responsibilities section of the job description.

In an embodiment, process 300 may include one or more processors configured to generate a standard job description comprising each job description section and the corresponding job description section sentence. For example, job description standardization component 250 may be configured to rank (e.g., using the PageRank algorithm) each job description sentence and/or each job description intent for each frequency value. Further, sentences having the same semantic meaning may be grouped together using BERT embeddings and further sentence with highest row wise similarity score (i.e., sum of similarities with all the other sentences) may be selected as the best sentence and a sentence frequency may be captured based on its group count. Furthermore, a page rank algorithm may be used to rank sentences having same frequency within the same section to reorder them selecting the best sentences that represents the semantic meaning. This process may be repeated across all the job description sections to arrive at the final list of job description sentences that can represent the best job description section.

Figure 4:
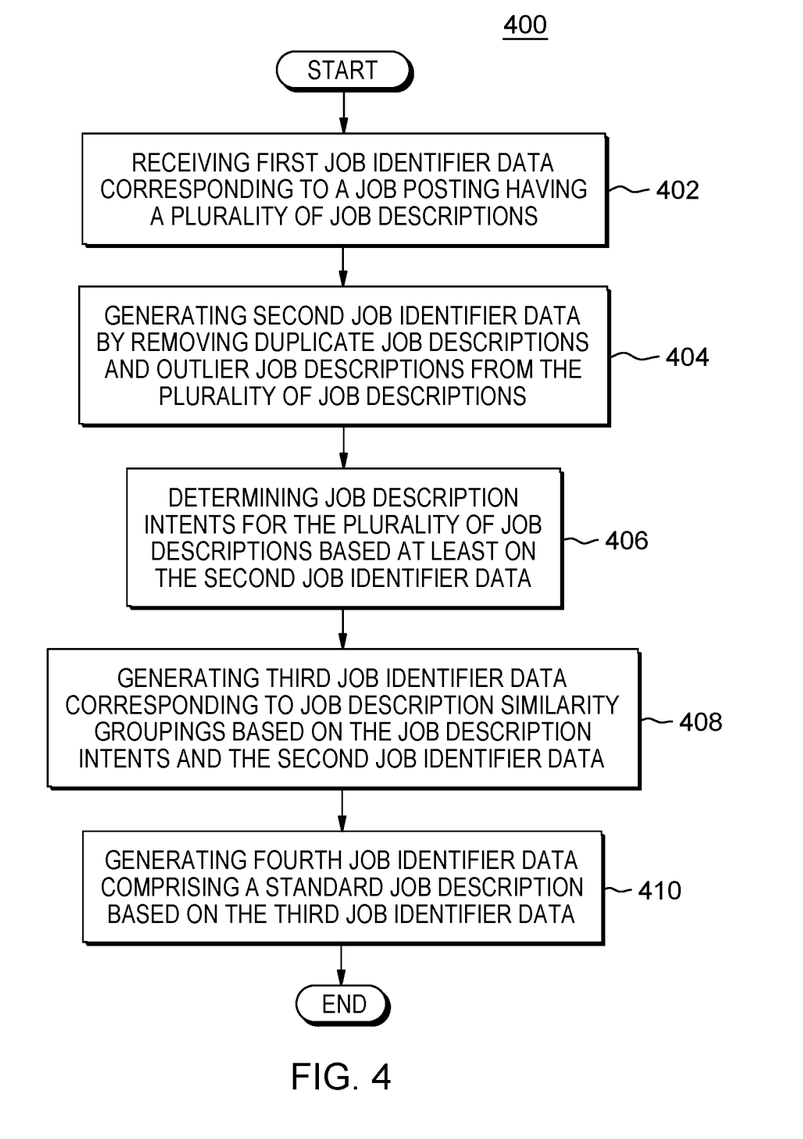
FIG. 4 depicts operational steps of a computer-implemented method for standardizing global entity job descriptions, in accordance with an embodiment of the present invention.

FIG. 4 depicts operational steps of a computer-implemented method 400 for standardizing global entity job descriptions, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computer-implemented method 400 for standardizing global entity job descriptions may include one or more processors configured for receiving 402 first job identifier data corresponding to a job posting having a plurality of job descriptions.

In an embodiment, computer-implemented method 400 may further include one or more processors configured for generating 404 second job identifier data by removing duplicate job descriptions and outlier job descriptions from the plurality of job descriptions.

In an embodiment, generating 404 second job identifier data may further include one or more processors configured for determining a language for each of the plurality of job descriptions is the same language. For example, the one or more processors may be configured to determine a language for each of the plurality of job descriptions using techniques known to those of ordinary skill in the art. Further, the one or more processors may be configured to compare the languages for each of the plurality of job descriptions to identify job descriptions having a language that is not the same as one or more of the other plurality of job descriptions. Job descriptions that do not have the same language as one or more of the other plurality of job descriptions may be removed from the job identifier data once identified and/or marked as nonmatching language job description in the job identifier data In an embodiment, generating 404 second job identifier data may further include one or more processors configured for identifying the outlier job descriptions as one or more job descriptions of the plurality of job descriptions having a similarity threshold satisfying a condition with the job position. For example, if the one or more processors identifies a first job description having a first job title with a similarity threshold less than a predetermined amount (e.g., 50%) with respect to the other job descriptions or with the job posting, then the first job description would be identified as an outlier job description. In an embodiment, outlier job descriptions may be removed from the job identifier data once identified and/or marked as an outlier job description in the job identifier data.

In an embodiment, computer-implemented method 400 may further include one or more processors configured for determining 406 job description intents for the plurality of job descriptions based at least on the second job identifier data. For example, determining 406 job description intents may include one or more processors configured for generating sentence tokens from the plurality of job descriptions in the second job identifier data based on a sentence delimiter. Further, determining 406 job description intents may include one or more processors configured for performing sentence cleaning on the sentence tokens to generate cleaned sentence tokens. In other words, the one or more processors may be configured to generate cleaned sentence tokens based on a sentence cleaning operation using the sentence tokens. Furthermore, determining 406 job description intents may include one or more processors configured for predicting the job description intents using a machine learning model.

In an embodiment, predicting the job description intents using a machine learning model may include one or more processors configured for receiving, at the machine learning model, data corresponding to the cleaned sentence tokens, processing, by the machine learning model, the cleaned sentence tokens, and generating, by the machine learning model, model output data corresponding to the job description intents.

In an embodiment, computer-implemented method 400 may further include one or more processors configured for generating 408 third job identifier data corresponding to job description similarity groupings based on the job description intents and the second job identifier data. For example, for generating 408 third job identifier data may include one or more processors configured for identifying job description sections in the second job identifier data as having sentence tokens satisfying a token condition. Further, generating 408 third job identifier data may include one or more processors configured for generating a similarity matrix comprising the sentence tokens for each of the job description sections. Further, generating 408 third job identifier data may include one or more processors configured for grouping one or more of the sentence tokens into grouped sentence tokens having a similarity threshold compared to the other sentence tokens satisfying a condition. In other words, one or more of the sentence tokens may be grouped into grouped sentence tokens having a similarity threshold with respect to the other sentence tokens.

Further, computer-implemented method 400 may further include one or more processors configured for generating 410 fourth job identifier data comprising a standard job description based on the third job identifier data. For example, generating 410 fourth job identifier data may include one or more processors configured for identifying a best sentence token as the sentence token of the grouped sentence tokens with a maximum similarity score compared to the other grouped sentence tokens. For example, generating 410 fourth job identifier data may include one or more processors configured for ranking the best sentence token for each job description section, mapping a job summary to a summary job description section, and generating the standard job description comprising the best sentence token for each job description section in each of the corresponding job description sections of a standardized template.

Figure 5:
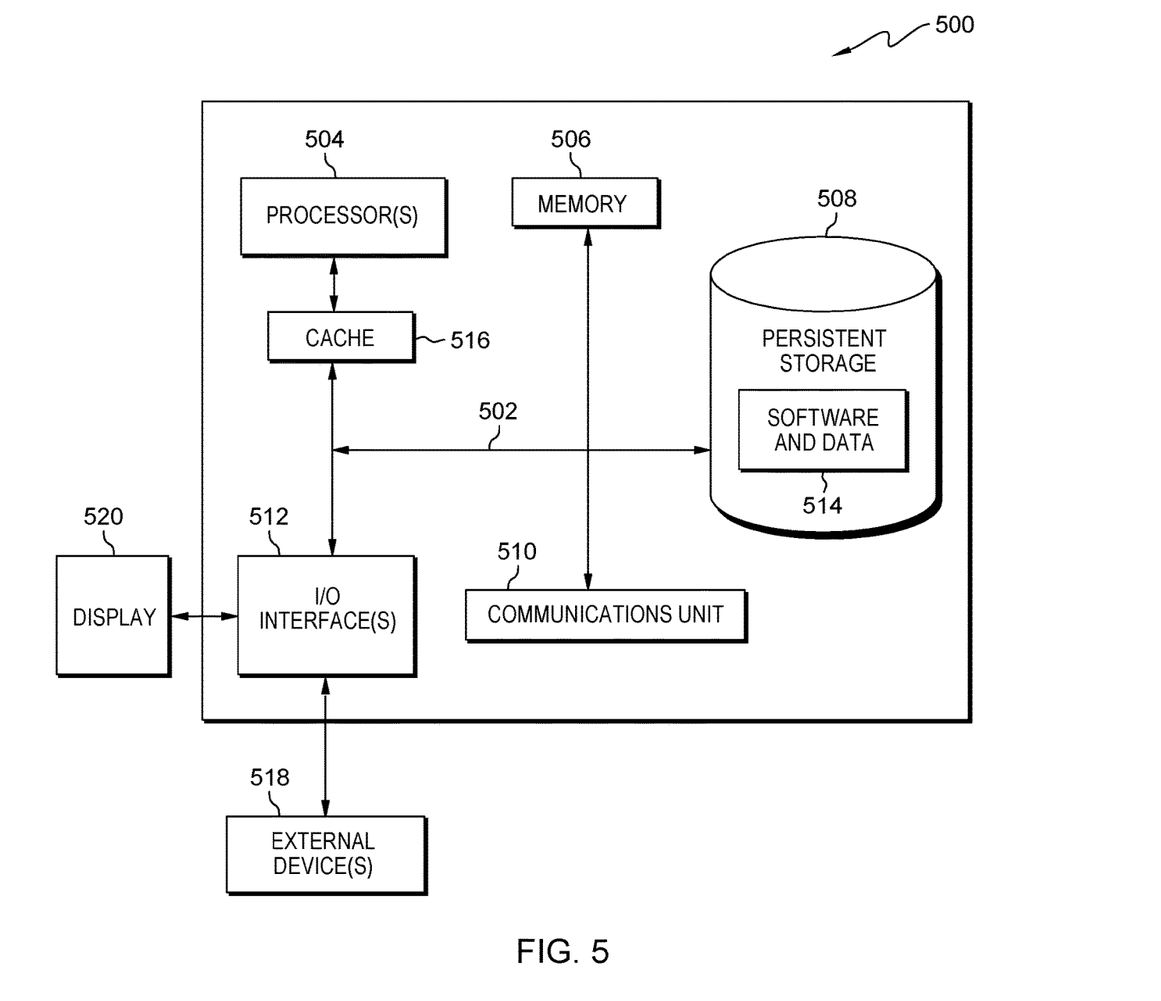
FIG. 5 depicts a block diagram of components of a server computer within the distributed data processing environment of FIG. 1, in accordance with an embodiment of the present invention.

FIG. 5 depicts a block diagram of components of a server computer (e.g., user device 120) within the distributed data processing environment of FIG. 1, in accordance with an embodiment of the present invention.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, as described herein, may be downloaded to persistent storage 508 through communications unit 510.

I/O interface(s) 512 allows for input and output of data with other devices that may be connected to user device 120. For example, I/O interface 512 may provide a connection to external devices 518 such as image sensor, a keyboard, a keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Software and data 514 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

training a bidirectional-Long Short-Term Memory (LSTM) deep learning model by providing sentences as model input data and job description section names as label information to the LSTM deep learning model, wherein the LSTM deep learning model comprises an LSTM layer followed by dense layers with ReLu activation followed by the output layer, and wherein the LSTM deep learning model is configured to generate model output data corresponding to predictions on the unseen model input data;

utilizing the LSTM layer to convert sentence sequences to word embeddings as part of an embedding layer, wherein the LSTM layer is configured to implement glove word vectors;

creating sentence embeddings based on the word embeddings and capturing a syntactic structure of the sentences using text tags, wherein the text tags comprise parts-of-speech (POS) tags, and verb tags;

training one or more machine learning models using a combination of the sentence embeddings and text tags as input features, wherein the sentence embeddings are visualized in a 2-dimensional space by applying t-Distributed Stochastic Neighbor Embedding (t-SNE);

encoding sentences into sentence embeddings using Siamese Bidirectional Encoder Representations from Transformers (BERT)-Networks;

training an intent identification component by inputting text sentences as model input data and job description section names as label information;

executing supervised learning techniques on shallow models to serve as a baseline for comparison with deep learning models;

receiving, by one or more processors and by the one or more machine learning models, first job identifier data corresponding to a job posting having a plurality of job descriptions;

utilizing the one or more machine learning models to capture a natural language structure from one or more sentences in the first job identifier by appending text tags of the one or more sentences, wherein the text tags assist the one or more machine learning models in learning the natural language sentence structures and intents;

generating, by the one or more machine learning models, input sentence classifications for a job description and corresponding job description based on the first job identifier data, wherein model input data may be configured to generate input sentence classifications for each job description and the corresponding job description sections;

responsive to extracting, by the one or more machine learning models, the first job identifier data from natural language text, processing extracted features from the first job identifier data to identify duplicate job descriptions in the plurality of job descriptions and marking, by the data preparation component, the identified duplicate job descriptions as duplicates;

receiving by the intent identification component, the processed extracted features and the marked duplicate job descriptions;

performing, through the one or more machine learning models, deduplication on the plurality of job descriptions by removing the identified duplicate job descriptions;

generating, by the one or more processors and by the one or more machine learning models, second job identifier data based on the deduplication and outlier job descriptions from the plurality of job descriptions;

determining, by one or more processors and by the one or more machine learning models, job description intents for the plurality of job descriptions based at least on the second job identifier data; and generating, by the one or more machine learning models, a standard job description comprising the job description section and a corresponding job description section sentence from the job description similarity groupings and deduplications.

2. The computer-implemented method of claim 1, wherein generating the second job identifier data further comprises:
   determining, by one or more processors, a language for each of the plurality of job descriptions is a same language; and
   identifying, by one or more processors, the outlier job descriptions as one or more job descriptions of the plurality of job descriptions having a similarity threshold satisfying a condition with the job posting.

3. The computer-implemented method of claim 1, wherein determining job description intents further comprises:
   generating, by one or more processors, sentence tokens from the plurality of job descriptions in the second job identifier data based on a sentence delimiter;
   performing, by one or more processors, sentence cleaning on the sentence tokens to generate cleaned sentence tokens; and
   predicting, by one or more processors, the job description intents using a machine learning model.

4. The computer-implemented method of claim 3, wherein predicting the job description intents further comprises:
   receiving, by one or more processors, at the machine learning model, the cleaned sentence tokens;
   processing, by the machine learning model, the cleaned sentence tokens; and
   generating, by the machine learning model, model output data corresponding to the job description intents.

5. The computer-implemented method of claim 1, wherein generating the third job identifier data further comprises:
   identifying, by one or more processors, job description sections in the second job identifier data as having sentence tokens satisfying a token condition;
   generating, by one or more processors, a similarity matrix comprising the sentence tokens for each of the job description sections; and
   grouping, by one or more processors, one or more of the sentence tokens into grouped sentence tokens having a similarity threshold compared to other sentence tokens satisfying a condition.

6. The computer-implemented method of claim 5, wherein generating fourth job identifier data further comprises:
   identifying, by one or more processors, a best sentence token as the sentence token of the grouped sentence tokens with a maximum similarity score compared to the other grouped sentence tokens.

7. The computer-implemented method of claim 6, wherein generating fourth job identifier data further comprises:

ranking, by one or more processors, the best sentence token for each job description section;
mapping, by one or more processors, a job summary to a summary job description section; and
generating, by one or more processors, the standard job description comprising the best sentence token for each job description section in each corresponding job description section of a standardized template.

8. A computer program product, comprising:
one or more computer readable storage media and program instructions collectively stored on one or more computer readable storage media, the stored program instructions comprising:
   program instructions to train a bidirectional-Long Short-Term Memory (LSTM) deep learning model by providing sentences as model input data and job description section names as label information to the LSTM deep learning model, wherein the LSTM deep learning model comprises an LSTM layer followed by dense layers with ReLu activation followed by the output layer, and wherein the LSTM deep learning model is configured to generate model output data corresponding to predictions on the unseen model input data;
   program instructions to utilize the LSTM layer to convert sentence sequences to word embeddings as part of an embedding layer, wherein the LSTM layer is configured to implement glove word vectors;
   program instructions to create sentence embeddings based on the word embeddings and capturing a syntactic structure of the sentences using text tags, wherein the text tags comprise parts-of-speech (POS) tags, and verb tags;
   program instructions to train one or more machine learning models using a combination of the sentence embeddings and text tags as input features, wherein the sentence embeddings are visualized in a 2-dimensional space by applying t-Distributed Stochastic Neighbor Embedding (t-SNE);
   program instructions to encode sentences into sentence embeddings using Siamese Bidirectional Encoder Representations from Transformers (BERT)-Networks;
   program instructions to train an intent identification component by inputting text sentences as model input data and job description section names as label information;
   program instructions to execute supervised learning techniques on shallow models to serve as a baseline for comparison with deep learning models;
   program instructions to receive, by one or more processors and by the one or more machine learning models, first job identifier data corresponding to a job posting having a plurality of job descriptions;
   program instructions to utilize the one or more machine learning models to capture a natural language structure from one or more sentences in the first job identifier by appending text tags of the one or more sentences, wherein the text tags assist the one or more machine learning models in learning the natural language sentence structures and intents;
   program instructions to generate, by the one or more machine learning models, input sentence classifications for a job description and corresponding job description based on the first job identifier data, wherein model input data may be configured to generate input sentence classifications for each job description and the corresponding job description sections;

responsive to extracting, by the one or more machine learning models, the first job identifier data from natural language text, program instructions to process extracted features from the first job identifier data to identify duplicate job descriptions in the plurality of job descriptions and mark, by the data preparation component, the identified duplicate job descriptions as duplicates;

program instructions to receive by the intent identification component, the processed extracted features and the marked duplicate job descriptions;

program instructions to perform, through the one or more machine learning models, deduplication on the plurality of job descriptions by removing the identified duplicate job descriptions;

program instructions to generate, by the one or more processors and by the one or more machine learning models, second job identifier data based on the deduplication and outlier job descriptions from the plurality of job descriptions;

program instructions to determine, by one or more processors and by the one or more machine learning models, job description intents for the plurality of job descriptions based at least on the second job identifier data; and program instructions to generate, by the one or more machine learning models, a standard job description comprising the job description section and a corresponding job description section sentence from the job description similarity groupings and deduplications.

9. The computer program product of claim 8, wherein the program instructions to generate the second job identifier data further comprises:
program instructions to determine a language for each of the plurality of job descriptions is a same language; and
program instructions to identify the outlier job descriptions as one or more job descriptions of the plurality of job descriptions having a similarity threshold satisfying a condition with the job posting.

10. The computer program product of claim 8, wherein the program instructions to determine the job description intents further comprises:
program instructions to generate sentence tokens from the plurality of job descriptions in the second job identifier data based on a sentence delimiter;
program instructions to perform sentence cleaning on the sentence tokens to generate cleaned sentence tokens; and
program instructions to predict the job description intents using a machine learning model.

11. The computer program product of claim 10, wherein the program instructions to predict the job description intents further comprises:
program instructions to receive, at the machine learning model, the cleaned sentence tokens;
program instructions to process, by the machine learning model, the cleaned sentence tokens; and
program instructions to generate, by the machine learning model, model output data corresponding to the job description intents.

12. The computer program product of claim 8, wherein the program instructions to generate the third job identifier data further comprises:

program instructions to identify job description sections in the second job identifier data as having sentence tokens satisfying a token condition;
program instructions to generate a similarity matrix comprising the sentence tokens for each of the job description sections; and
program instructions to group one or more of the sentence tokens into grouped sentence tokens having a similarity threshold compared to other sentence tokens satisfying a condition.

13. The computer program product of claim 12, wherein the program instructions to generate the fourth job identifier data further comprises:
program instructions to identify a best sentence token as the sentence token of the grouped sentence tokens with a maximum similarity score compared to the other grouped sentence tokens.

14. The computer program product of claim 12, wherein the program instructions to generate the fourth job identifier data further comprises:
program instructions to rank the best sentence token for each job description section;
program instructions to map a job summary to a summary job description section; and
program instructions to generate the standard job description comprising the best sentence token for each job description section in each corresponding job description section of a standardized template.

15. A computer system, comprising:
one or more computer processors;
one or more computer readable storage media;
program instructions collectively stored on one or more computer readable storage media for execution by at least one of one or more computer processors, the stored program instructions comprising:
program instructions to train a bidirectional-Long Short-Term Memory (LSTM) deep learning model by providing sentences as model input data and job description section names as label information to the LSTM deep learning model, wherein the LSTM deep learning model comprises an LSTM layer followed by dense layers with ReLu activation followed by the output layer, and wherein the LSTM deep learning model is configured to generate model output data corresponding to predictions on the unseen model input data;
program instructions to utilize the LSTM layer to convert sentence sequences to word embeddings as part of an embedding layer, wherein the LSTM layer is configured to implement glove word vectors;
program instructions to create sentence embeddings based on the word embeddings and capturing a syntactic structure of the sentences using text tags, wherein the text tags comprise parts-of-speech (POS) tags, and verb tags;
program instructions to train one or more machine learning models using a combination of the sentence embeddings and text tags as input features, wherein the sentence embeddings are visualized in a 2-dimensional space by applying t-Distributed Stochastic Neighbor Embedding (t-SNE);
program instructions to encode sentences into sentence embeddings using Siamese Bidirectional Encoder Representations from Transformers (BERT)-Networks;
program instructions to train an intent identification component by inputting text sentences as model input data and job description section names as label information;

program instructions to execute supervised learning techniques on shallow models to serve as a baseline for comparison with deep learning models;

program instructions to receive, by one or more processors and by the one or more machine learning models, first job identifier data corresponding to a job posting having a plurality of job descriptions;

program instructions to utilize the one or more machine learning models to capture a natural language structure from one or more sentences in the first job identifier by appending text tags of the one or more sentences, wherein the text tags assist the one or more machine learning models in learning the natural language sentence structures and intents;

program instructions to generate, by the one or more machine learning models, input sentence classifications for a job description and corresponding job description based on the first job identifier data, wherein model input data may be configured to generate input sentence classifications for each job description and the corresponding job description sections;

responsive to extracting, by the one or more machine learning models, the first job identifier data from natural language text, program instructions to process extracted features from the first job identifier data to identify duplicate job descriptions in the plurality of job descriptions and mark, by the data preparation component, the identified duplicate job descriptions as duplicates;

program instructions to receive by the intent identification component, the processed extracted features and the marked duplicate job descriptions;

program instructions to perform, through the one or more machine learning models, deduplication on the plurality of job descriptions by removing the identified duplicate job descriptions;

program instructions to generate, by the one or more processors and by the one or more machine learning models, second job identifier data based on the deduplication and outlier job descriptions from the plurality of job descriptions;

program instructions to determine, by one or more processors and by the one or more machine learning models, job description intents for the plurality of job descriptions based at least on the second job identifier data; and program instructions to generate, by the one or more machine learning models, a standard job description comprising the job description section and a corresponding job description section sentence from the job description similarity groupings and deduplications.

16. The computer system of claim 15, wherein the program instructions to generate the second job identifier data further comprises:

program instructions to determine a language for each of the plurality of job descriptions is a same language; and program instructions to identify the outlier job descriptions as one or more job descriptions of the plurality of job descriptions having a similarity threshold satisfying a condition with the job posting.

17. The computer system of claim 15, wherein the program instructions to determine the job description intents further comprises:

program instructions to generate sentence tokens from the plurality of job descriptions in the second job identifier data based on a sentence delimiter;

program instructions to perform sentence cleaning on the sentence tokens to generate cleaned sentence tokens; and program instructions to predict the job description intents using a machine learning model.

18. The computer system of claim 17, wherein the program instructions to predict the job description intents further comprises:

program instructions to receive, at the machine learning model, the cleaned sentence tokens;

program instructions to process, by the machine learning model, the cleaned sentence tokens; and program instructions to generate, by the machine learning model, model output data corresponding to the job description intents.

19. The computer system of claim 15, wherein the program instructions to generate the third job identifier data further comprises:

program instructions to identify job description sections in the second job identifier data as having sentence tokens satisfying a token condition;

program instructions to generate a similarity matrix comprising the sentence tokens for each of the job description sections; and program instructions to group one or more of the sentence tokens into grouped sentence tokens having a similarity threshold compared to other sentence tokens satisfying a condition.

20. The computer system of claim 19, wherein the program instructions to generate the fourth job identifier data further comprises:

program instructions to identify a best sentence token as the sentence token of the grouped sentence tokens with a maximum similarity score compared to the other grouped sentence tokens;

program instructions to rank the best sentence token for each job description section;

program instructions to map a job summary to a summary job description section; and program instructions to generate the standard job description comprising the best sentence token for each job description section in each corresponding job description section of a standardized template.

* * * * *